UNITED STATES PATENT OFFICE.

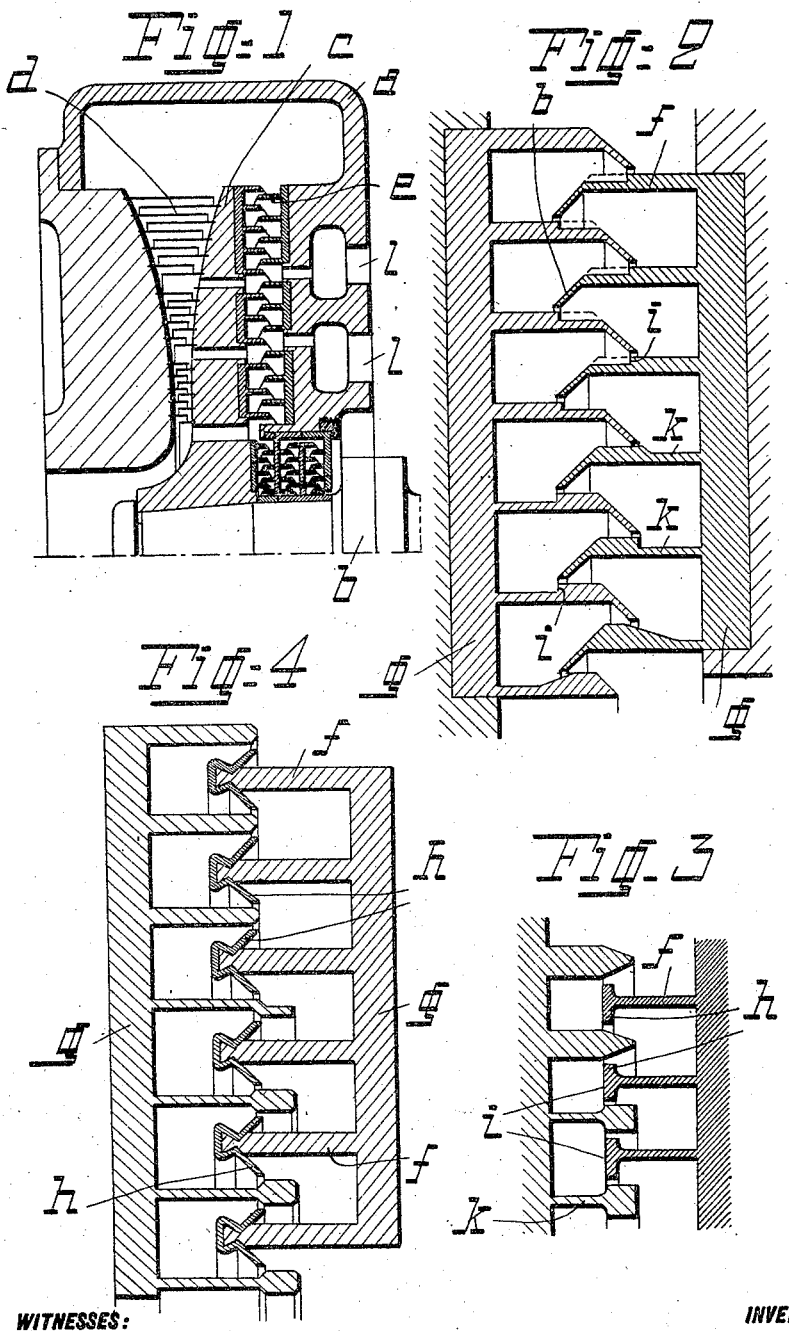

FREDRIK LJUNGSTRÖM, OF LILJEHOLMEN, STOCKHOLM, SWEDEN, ASSIGNOR TO AKTIEBOLAGET LJUNGSTRÖMS ÅNGTURBIN, OF STOCKHOLM, SWEDEN.

PACKING FOR SELF-BALANCING PURPOSES.

997,628.  Specification of Letters Patent.  Patented July 11, 1911.

Application filed March 17, 1911. Serial No. 615,037.

*To all whom it may concern:*

Be it known that I, FREDRIK LJUNGSTRÖM, engineer, a subject of the King of Sweden, and resident of Liljeholmen, Stockholm, in the Kingdom of Sweden, have invented certain new and useful Improvements in Packings for Self-Balancing Purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In gas- or steam turbines, compressors or the like, in which a vane-carrying disk or drum is axially actuated by gas- or steam-pressure it has been attempted not only to balance the greater part of this pressure, but also to balance it in such a way that without using cam bearings the rotating disk or drum automatically will occupy its suitable position in spite of the variations in pressure. This is attained by providing the disk or drum with a counter-pressure surface, whereon there is acting a pressure counter-acting the axial pressure of the steam or gas.

In order to adjust the pressure and the counter-pressure as strictly as possible, so that the same will balance each other as near as possible, the counter-pressure has been caused to act on a surface which was a limit of a pressure chamber, which communicated by means of labyrinth packings with an inlet for the pressure medium, also with an outlet for the pressure medium. These labyrinth packings were made in such a way that one of them changed by flexure at the axial movements, the pressure in the pressure chamber thereby also changing. It is of great importance in such packings that the changes in the packing passages be relatively great and effected by axial movements of the drum or disk. To this end I provide each packing ring with at least one flange projecting toward a proximate packing ring, overlapping or underlapping it from the other side and provided with a sharp corner edge the opposing rim having a shoulder or other part presenting another sharp corner edge arranged for contact with the edge first mentioned. Some part, preferably the flange, of at least one of said rings is made thinner than the rest and readily flexible, such part serving as a portion of the wall of a chamber for the actuating fluid, so that the flexure of the said part must vary the capacity of said space. The construction and relative arrangement of these opposed sharp corners is such as to secure the maximum flexure from the minimum movement of said rings toward and against each other.

The invention is illustrated in the annexed drawing, on which—

Figure 1 shows a radial turbine in longitudinal section. Figs. 2, 3 and 4 show several embodiments on a greater scale.

*a* indicates the turbine casing, *b* the shaft, *c* the rotating disk secured to the shaft, *d* the vanes and *e* the labyrinth packing.

According to Fig. 2 said packing consists of a number of axial rings *f* inserted into each other and secured to disks *g*. Said rings are provided with lateral projections *h* coöperating with edges *i* on the adjacent rings, said edges being preferably formed by recesses *k* in the rings. As shown, the recesses are placed in such a way that the leak-passages between the upper rings will be increased, when the passages between the lower rings will remain unchanged or the reverse. The upper or lower rings may also be built in the way shown in dotted lines, no change in the area of the upper or lower passages being caused at the movements. The edges *i* may also be made with an inclined face as shown on the bottom part of Fig. 2.

Figs. 3 and 4 show embodiments, in which only every other ring is provided with lateral projections. According to Fig. 3 the rings are either of a conical shape or provided with recesses *k*. According to Fig. 4 the projections *h* consist of distinct parts not integral but secured to the rings.

For the purpose of enabling the introduction of the driving medium into the outer vane rings at the overloading of the turbine, the whole labyrinth packing *e* is divided into several groups, each one being of the construction described.

What I claim is:—

1. A labyrinth packing comprising rings which overlap alternately from opposite sides and are movable toward each other, at least one of each two rings being provided with a flexible part constituting a portion of the wall of a fluid chamber, and every two disks having also sharp corner edges opposed to each other for the purpose of securing the maximum flexure by the minimum movement of said rings.

2. A labyrinth packing comprising rings overlapping alternately from opposite sides, each of said rings having a flexible flange thinner than the body of the ring and provided with a sharp corner edge, every ring also having a part provided with a corresponding edge presented to the edge of the said flange of the proximate ring for the purpose set forth.

3. A labyrinth packing comprising rings overlapping alternately from opposite sides and movable toward and from each other, but fixed together on each side, said rings having flexible parts each of which forms a portion of a fluid chamber variable in capacity by such pressure, said parts being further provided with corner edges arranged to give the maximum flexure for the minimum movement of said rings toward and against each other.

In testimony that I claim the foregoing as my invention, I have signed my name in presence of two subscribing witnesses.

FREDRIK LJUNGSTRÖM.

Witnesses:
HEDING MELINDER,
HARRY ALRIHU.